(12) United States Patent
Narushima

(10) Patent No.: US 10,379,398 B2
(45) Date of Patent: Aug. 13, 2019

(54) BACKLIGHT UNIT AND HEAD-UP DISPLAY DEVICE

(71) Applicant: Yazaki Corporation, Tokyo (JP)

(72) Inventor: Noriaki Narushima, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/120,678

(22) Filed: Sep. 4, 2018

(65) Prior Publication Data
US 2019/0072791 A1 Mar. 7, 2019

(30) Foreign Application Priority Data

Sep. 6, 2017 (JP) ................... 2017-170942

(51) Int. Cl.
*G02F 1/13357* (2006.01)
*G02B 27/01* (2006.01)

(52) U.S. Cl.
CPC ........ *G02F 1/1336* (2013.01); *G02B 27/0101* (2013.01); *G02B 2027/0118* (2013.01); *G02F 2201/34* (2013.01)

(58) Field of Classification Search
CPC ........ G02B 2027/0118; G02B 27/0101; G02F 1/1336; G02F 2201/34
See application file for complete search history.

(56) References Cited

U.S. PATENT DOCUMENTS

| | | | | |
|---|---|---|---|---|
| 9,684,179 B2* | 6/2017 | Juni | ................... | G02B 5/09 |
| 9,720,234 B2* | 8/2017 | Border | ............... | G02B 27/0172 |
| 10,254,551 B2* | 4/2019 | Kishigami | ............... | G02B 5/30 |
| 2017/0299922 A1 | 10/2017 | Matsuura et al. | | |
| 2018/0348562 A1* | 12/2018 | Yoshida | .............. | G02F 1/13362 |
| 2019/0072799 A1* | 3/2019 | Narushima | ......... | G02F 1/13362 |
| 2019/0072800 A1* | 3/2019 | Narushima | ......... | G02F 1/13362 |
| 2019/0129171 A1* | 5/2019 | Narushima | ............... | B60R 1/00 |

FOREIGN PATENT DOCUMENTS

JP 2016-065908 A 4/2016

\* cited by examiner

*Primary Examiner* — Tracie Y Green
(74) *Attorney, Agent, or Firm* — Sughrue Mion, PLLC

(57) ABSTRACT

A backlight unit includes a light source, a light collecting member that collects light emitted from the light source, and a concave reflecting surface, and includes a micromirror array that reflects the light incident from the light collecting member toward a liquid crystal panel by the reflecting surface and a diffusion plate that is arranged on an optical path between the micromirror array and the liquid crystal panel. In the micromirror array, the reflecting surface includes the plurality of micromirrors. One or more groups of the plurality of micromirrors are arranged in the reflecting surface in an X direction and a Y direction. Each micromirror includes a convex or concave curved surface.

8 Claims, 11 Drawing Sheets

BACKLIGHT UNIT AND HEAD-UP DISPLAY DEVICE

CROSS-REFERENCE TO RELATED APPLICATION(S)

The present application claims priority to and incorporates by reference the entire contents of Japanese Patent Application No. 2017-170942 filed in Japan on Sep. 6, 2017.

BACKGROUND OF THE INVENTION

1. Field of the Invention

The present invention relates to a backlight unit and a head-up display device.

2. Description of the Related Art

Conventionally, backlight units used for head-up display devices or the like have been known. For example, in a technique disclosed in Japanese Patent Application Laid-open No. 2016-65908, light of a light source is converted into parallel light through a parallel light generating unit, light of a plurality of light source images is then generated from parallel light through a lens array, and the light of a plurality of light source images is collected on a liquid crystal panel through a collecting lens or the like, so that luminance unevenness of the liquid crystal panel is reduced. Further, in the technique disclosed in JP 2016-65908 A, the length of the backlight unit in the depth direction is reduced by arranging a reflecting unit on an optical path between the light source and the liquid crystal panel and folding the optical path.

However, in order to illuminate the entire surface of the liquid crystal panel, it is necessary to convert divergent light into parallel light through the parallel light generating unit and prepare a plurality of light sources for the lens array, and there is room for improvement since the number of parts is large, and the size is large.

SUMMARY OF THE INVENTION

It is an object of the present invention to provide a backlight unit and a head-up display device which are capable of achieving a decrease in the number of parts and size reduction.

In order to solve the above mentioned problem and achieve the object, a backlight unit according to one aspect of the present invention includes at least one light source; a light collecting member that collects light emitted from the light source; an optical member that includes a concave reflecting surface and reflects light incident from the light collecting member toward a light transmissive liquid crystal display element by the reflecting surface; and a diffusion plate that is arranged on an optical path between the optical member and the liquid crystal display element, wherein the reflecting surface of the optical member includes a plurality of micromirrors, one or more groups of the plurality of micromirrors are arranged in the reflecting surface in a first direction and a second direction orthogonal to the first direction, and each of the micromirrors includes a convex or concave curved surface.

According to another aspect of the present invention, in the backlight unit, it is preferable that the respective micromirrors are formed such that the curved surfaces have the same curvatures in at least one of the first direction and the second direction, and differ in a length in a direction in which the curved surfaces have the same curvature.

According to still another aspect of the present invention, in the backlight unit, it is preferable that the respective micromirrors are formed such that a length in the direction in which the curved surfaces have the same curvature differs for each of areas obtained by dividing the reflecting surface in the direction in which the curved surfaces have the same curvature.

According to still another aspect of the present invention, in the backlight unit, it is preferable that the respective micromirrors are formed such that lengths in the direction in which the curved surfaces have the same curvature are consecutively different.

According to still another aspect of the present invention, in the backlight unit, it is preferable that the respective micromirrors are formed such that lengths in at least one of the first direction and the second direction are equal, and curvatures of the curved surfaces are different in a direction in which the micromirrors have the same length.

According to still another aspect of the present invention, in the backlight unit, it is preferable that the respective micromirrors are formed such that the curvature of the curved surface in the direction in which the micromirrors have the same length differs for each of areas obtained by dividing the reflecting surface in the direction in which the micromirrors have the same length.

According to still another aspect of the present invention, in the backlight unit, it is preferable that the respective micromirrors are formed such that lengths in at least one of the first direction and the second direction are equal, the curved surface is a free curved surface including a plurality of curvatures, and the plurality of curvatures are set to be different in accordance with an angle of deviation amount of reflected light to the liquid crystal display element with respect to incident light from the light collecting member in a direction in which the micromirrors have the same length.

In order to achieve the object, a head-up display device according to still another aspect of the present invention includes a light transmissive liquid crystal display element; and a backlight unit, wherein the backlight unit includes: at least one light source; a light collecting member that collects light emitted from the light source; an optical member that includes a concave reflecting surface and reflects light incident from the light collecting member toward the liquid crystal display element by the reflecting surface; and a diffusion plate that is arranged on an optical path between the optical member and the liquid crystal display element, the reflecting surface of the optical member includes a plurality of micromirrors, one or more groups of the plurality of micromirrors are arranged in the reflecting surface in a first direction and a second direction orthogonal to the first direction, and each of the micromirrors includes a convex or concave curved surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, exemplary embodiments of a backlight unit and a head-up display device according to the present invention will be described in detail with reference to the appended drawings. The present invention is not limited by the following embodiments. Further, constituent elements in the following embodiments include those that can be easily assumed by those skilled in the art or are substantially the same. Further, various omissions, substitutions, and changes can be made to the constituent elements in the following embodiments within the scope not deviating from the gist of the invention. Further, configurations described below can be appropriately combined.

First Embodiment

Figure 1:
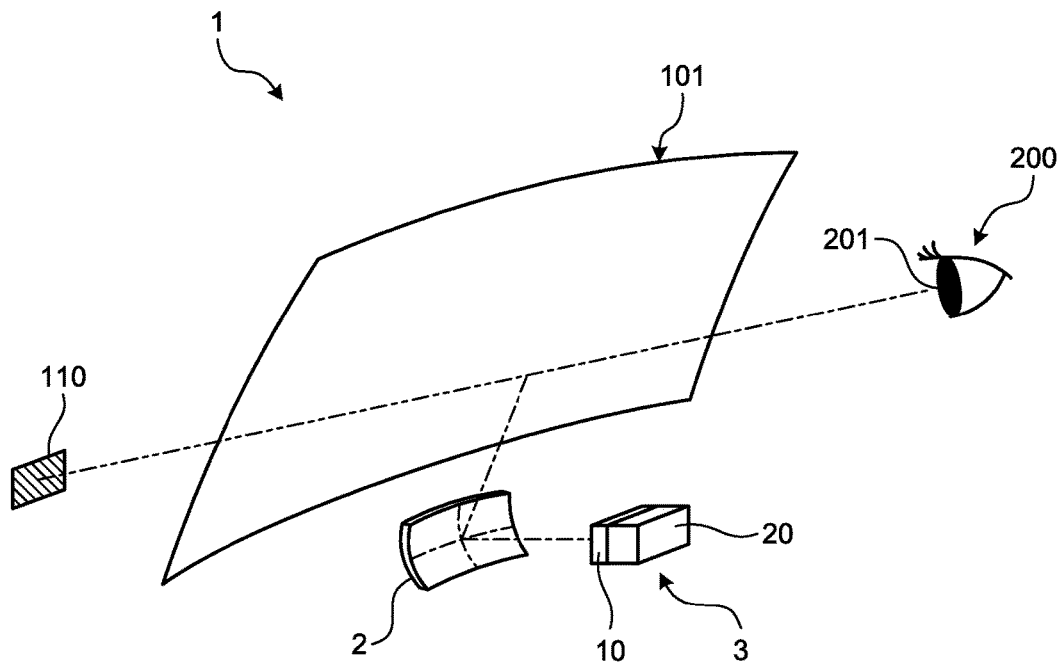
FIG. 1 is a schematic configuration diagram of a head-up display device according to a first embodiment.
Figure 2:
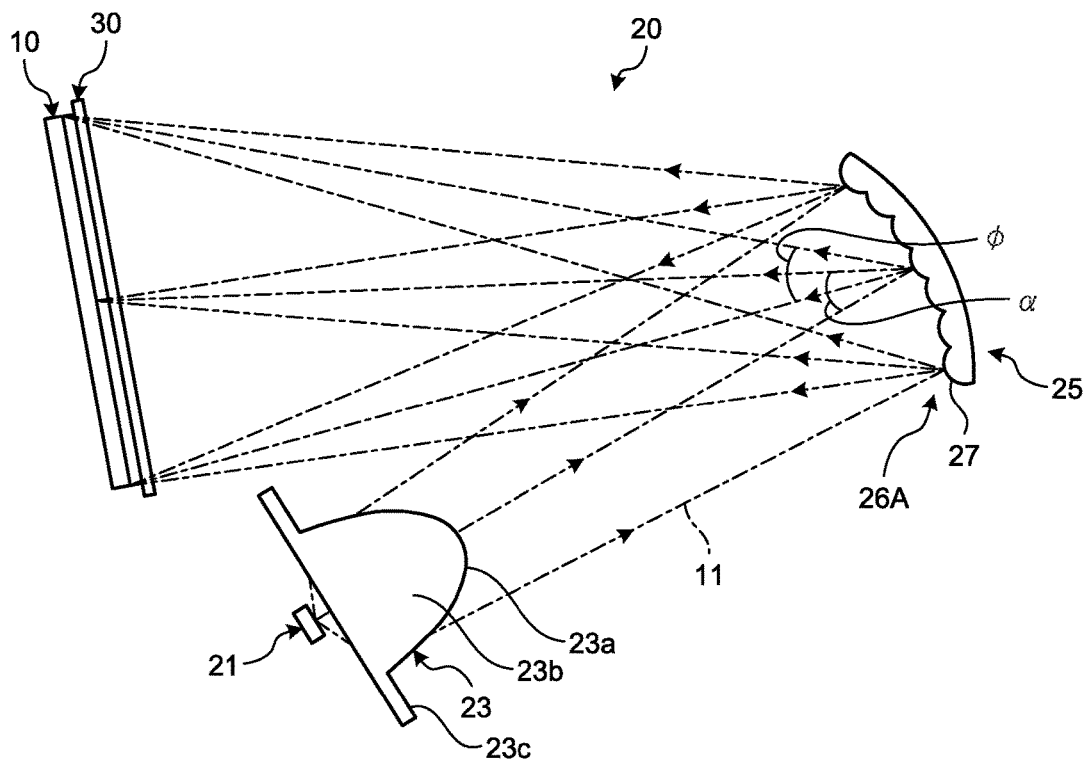
FIG. 2 is a schematic configuration diagram of a backlight unit according to the first embodiment.
Figure 3:
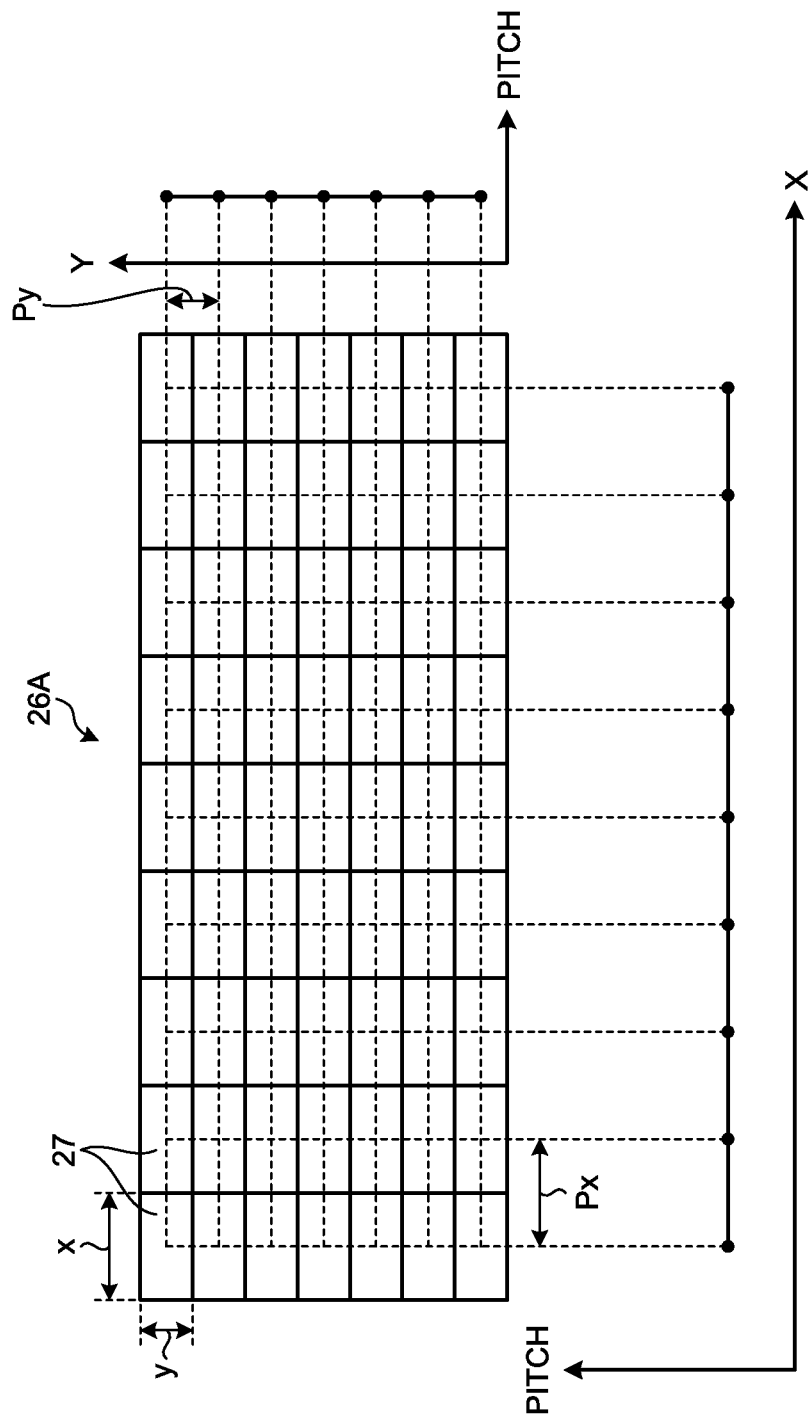
FIG. 3 is a front view of a micromirror array according to the first embodiment.
Figure 4:
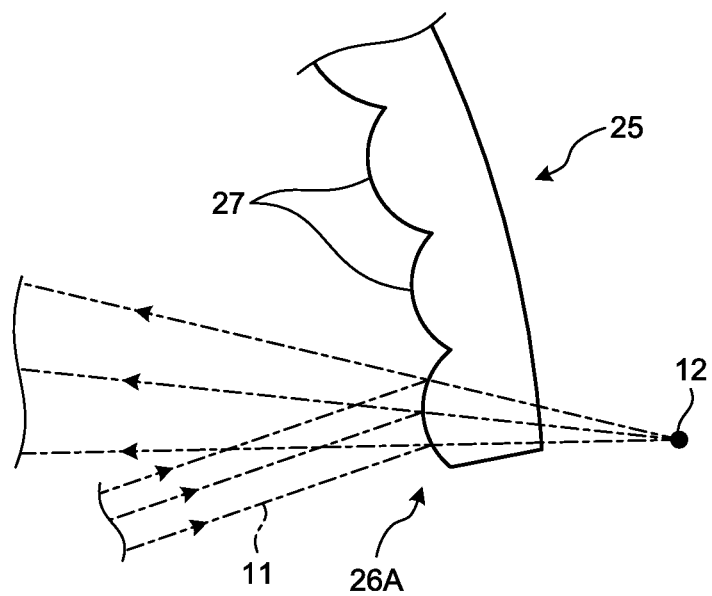
FIG. 4 is a partially enlarged view of the micromirror array according to the first embodiment.
Figure 5:
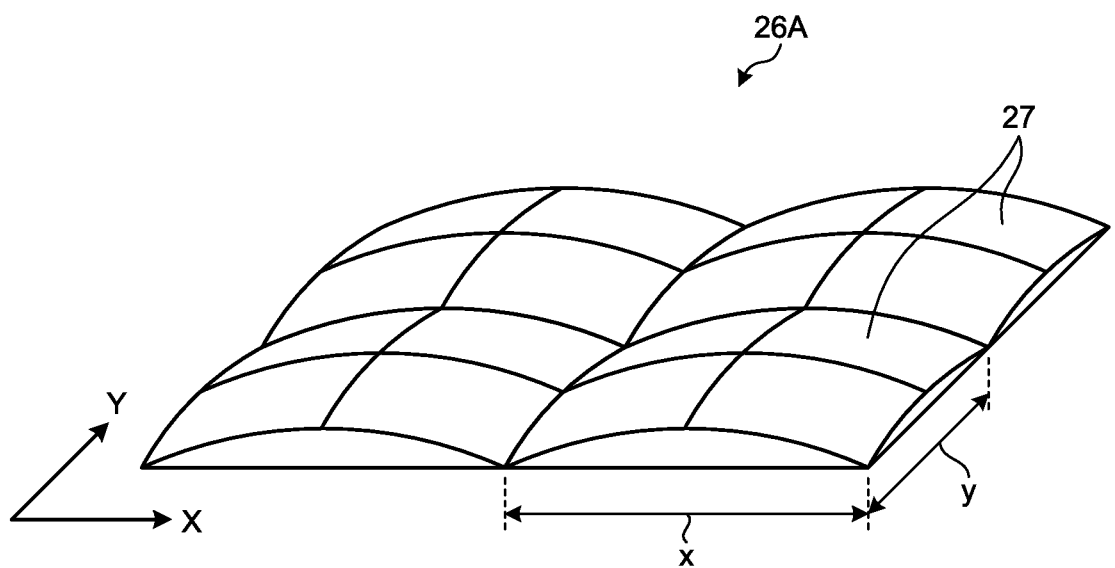
FIG. 5 is a perspective view of a micromirror according to the first embodiment.
Figure 6A:
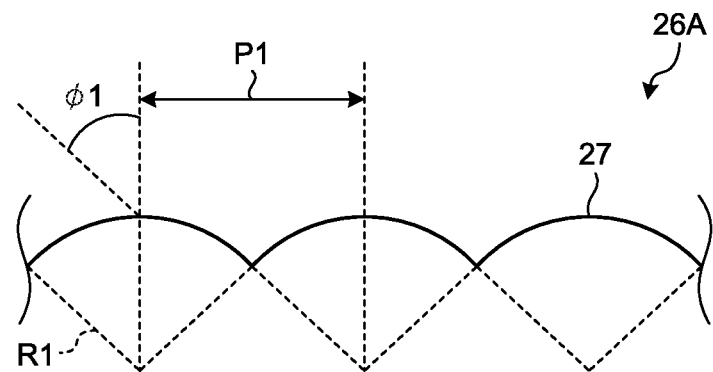
FIGS. 6A to 6C are diagrams for describing a curvature and a diverging angle of the micromirror according to the first embodiment.
Figure 6B:
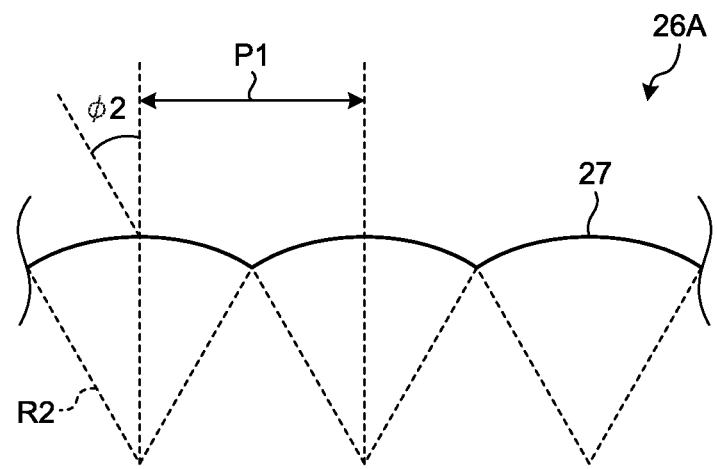
Figure 6C:
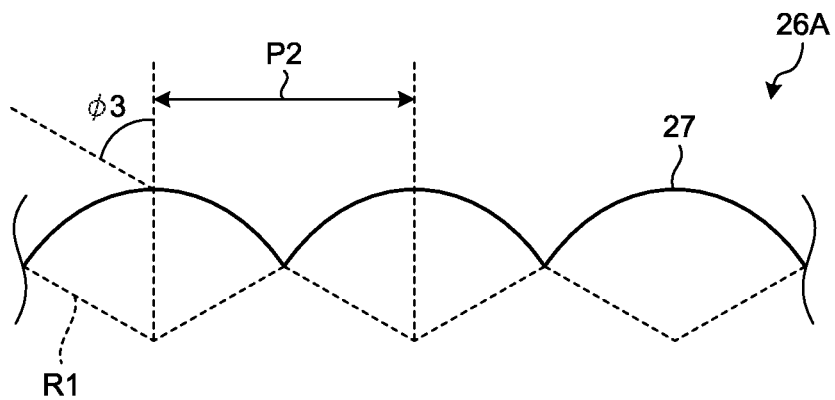
Figure 7:
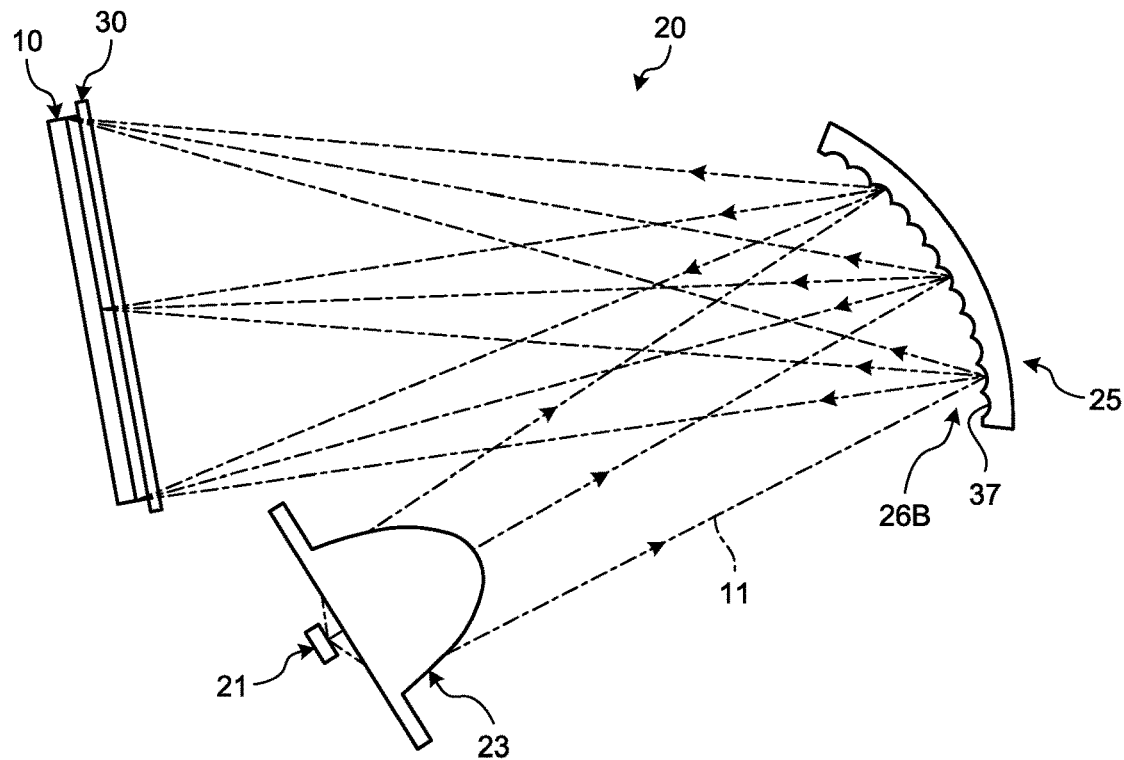
FIG. 7 is a schematic configuration diagram of a backlight unit according to a first modified example of the first embodiment.
Figure 8:
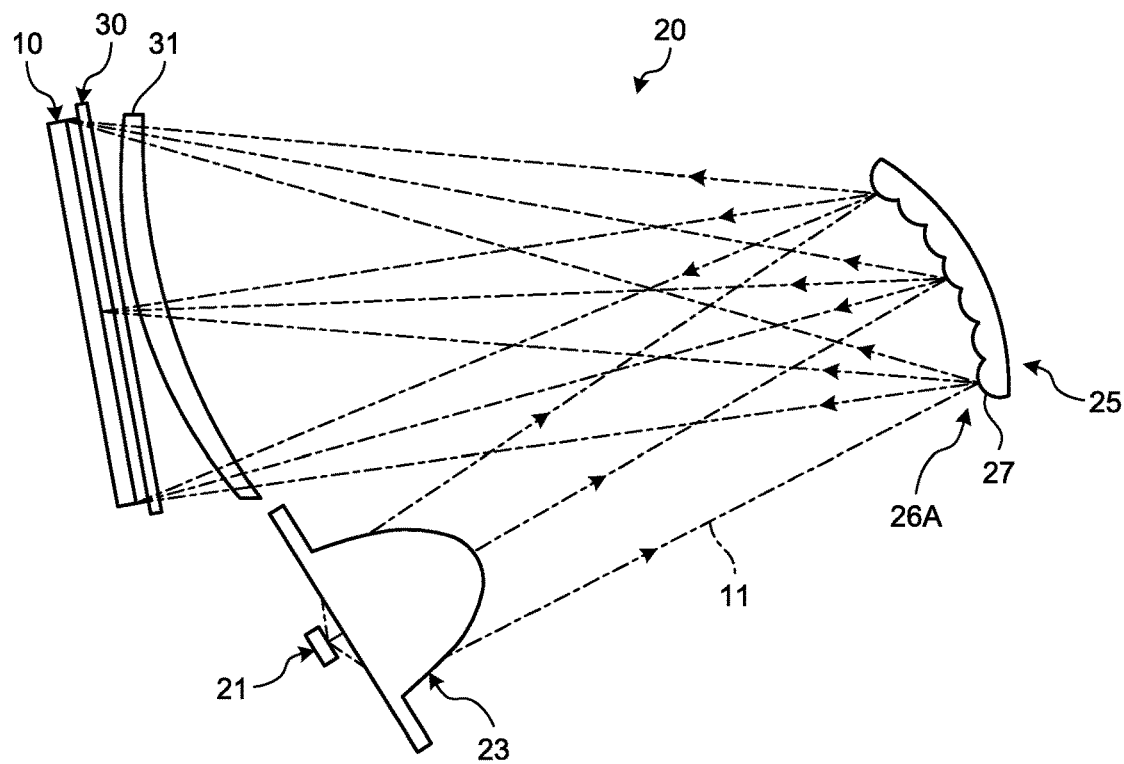
FIG. 8 is a schematic configuration diagram of a backlight unit according to a second modified example of the first embodiment.
Figure 9:
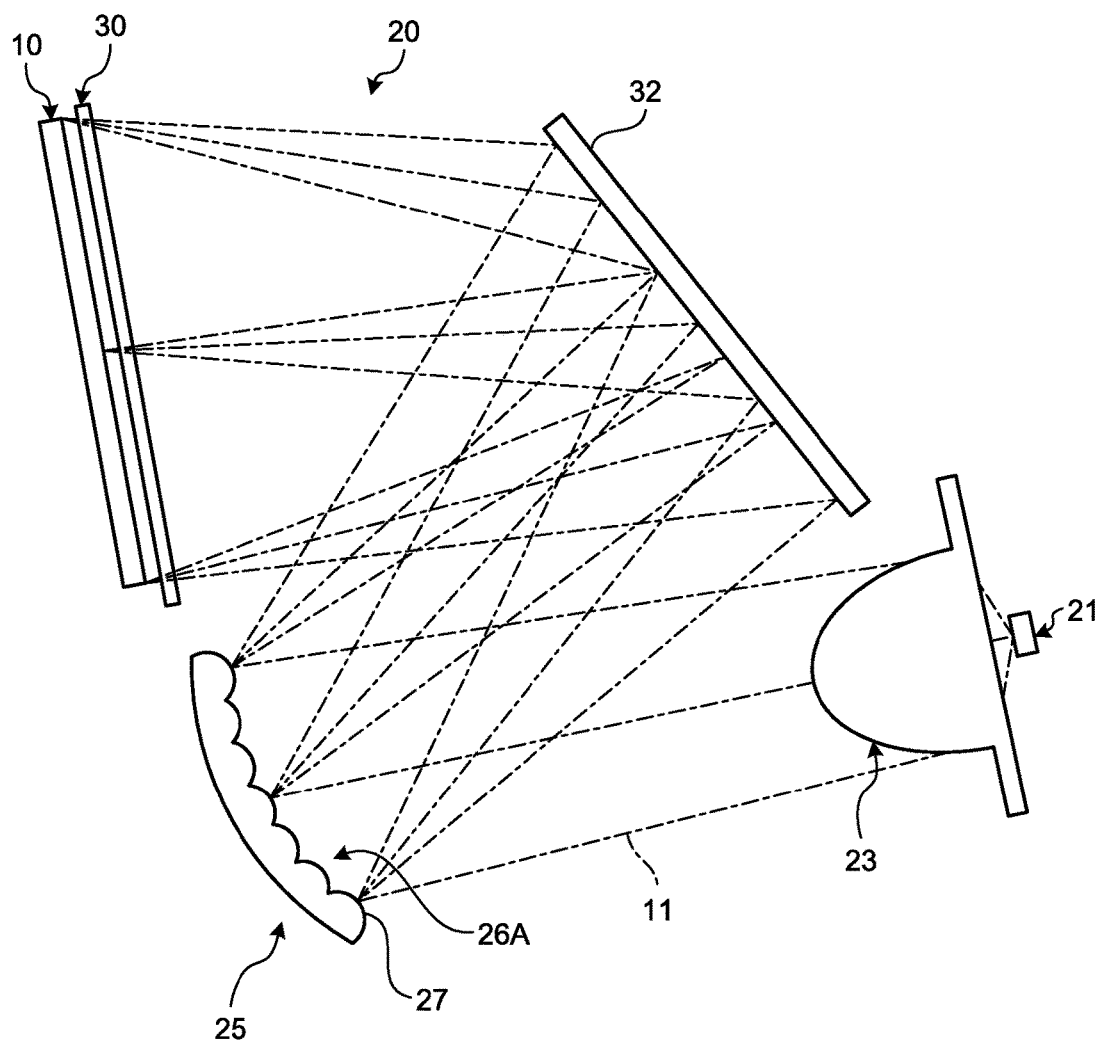
FIG. 9 is a schematic configuration diagram of a backlight unit according to a third modified example of the first embodiment.
Figure 10:
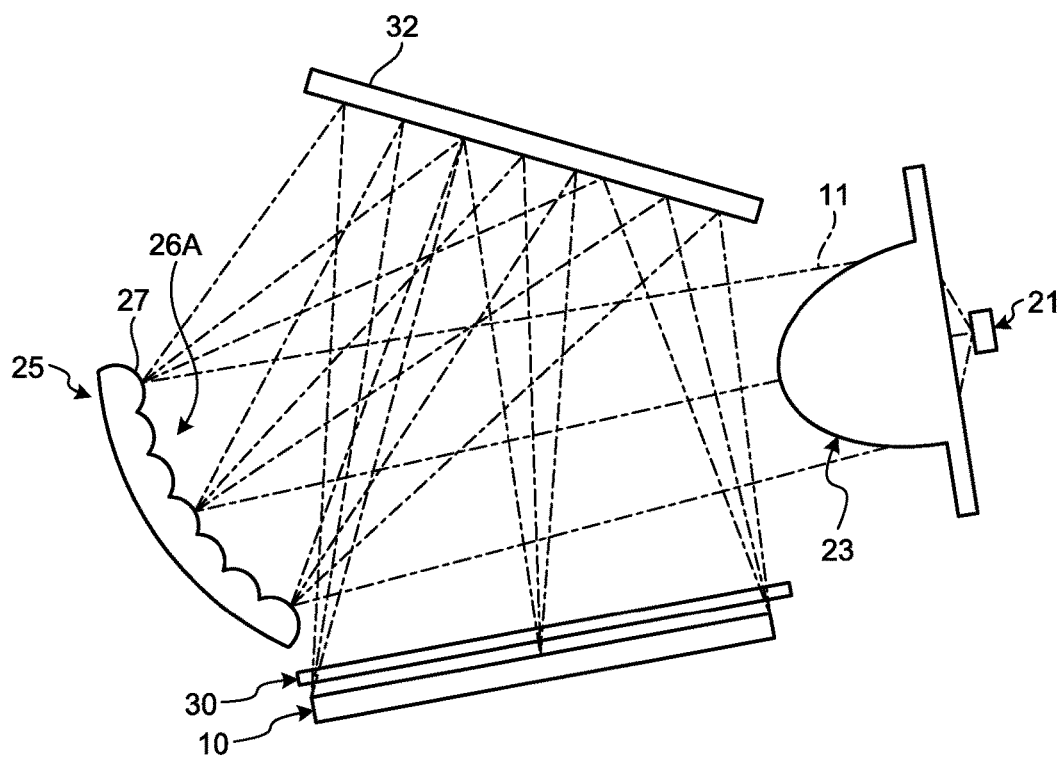
FIG. 10 is a schematic configuration diagram of a backlight unit according to a fourth modified example of the first embodiment.

A backlight unit and a head-up display device according to a first embodiment will be described. FIG. 1 is a schematic configuration diagram of a head-up display device according to a first embodiment. FIG. 2 is a schematic configuration diagram of a backlight unit according to the first embodiment. FIG. 3 is a front view of a micromirror array according to the first embodiment. FIG. 4 is a partially enlarged view of the micromirror array according to the first embodiment. FIG. 5 is a perspective view of a micromirror according to the first embodiment. FIGS. 6A to 6C are diagrams for describing a curvature and a diverging angle of the micromirror according to the first embodiment. FIG. 7 is a schematic configuration diagram of a backlight unit according to a first modified example of the first embodiment. FIG. 8 is a schematic configuration diagram of a backlight unit according to a second modified example of the first embodiment. FIG. 9 is a schematic configuration diagram of a backlight unit according to a third modified example of the first embodiment. FIG. 10 is a schematic configuration diagram of a backlight unit according to a fourth modified example of the first embodiment. Here, FIG. 2 illustrates a position relation of respective elements in a case in which a backlight unit is viewed from the side (the same applies to FIGS. 7 to 10). FIG. 3 is a front view of a micromirror array viewed from a reflecting surface side (the same applies to FIGS. 11 to 13).

As illustrated in FIG. 1, a head-up display device 1 according to the present embodiment is arranged in a dashboard (not illustrated) of a vehicle (not illustrated) such as an automobile and projects a display image onto a windshield 101. The head-up display device 1 projects the display image onto the windshield 101 and causes a virtual image 110 to be displayed in front of an eye point 201 of a driver 200. The eye point 201 is a position which is predetermined as a viewpoint position of the driver 200 sitting on the driver's seat (not illustrated). The driver 200 recognizes an image reflected by the windshield 101 as the virtual image 110. The virtual image 110 is recognized in front of the windshield 101 by the driver 200. The head-up display device 1 includes a magnifying mirror 2 and a display unit 3. The magnifying mirror 2 reflects display light emitted from the display unit 3 toward the windshield 101. The magnifying mirror 2 is configured with, for example, an aspherical mirror. The display unit 3 emits the display light corresponding to the display image. The display unit 3 includes a liquid crystal panel 10 and a backlight unit 20.

The liquid crystal panel 10 is a liquid crystal display element. The liquid crystal panel 10 is configured with, for example, a light transmissive or light semi-transmissive thin film transistor liquid crystal display (TFT LCD) or the like. The liquid crystal panel 10 displays a display image including a number, a character, graphics, or the like in response to a control instruction from a controller (not illustrated) installed in the vehicle.

The backlight unit 20 irradiates the liquid crystal panel 10 with light from the back side. The backlight unit 20 is driven by DC power obtained from a power source (not illustrated) in the vehicle. As illustrated in FIG. 2, the backlight unit 20 includes a light source 21, a light collecting member 23, a micromirror array 25, and a diffusion plate 30.

The light source 21 is configured with one light emitting diode (LED). For example, the LED is driven by DC power obtained from a power source in the vehicle. The LED is turned on or off in accordance with an ON or OFF signal from the controller. The LED is fixed to, for example, a substrate (not illustrated) or the like. A heat sink (not illustrated) may be fixed on a back side of the substrate. The heat sink releases heat accumulated on the substrate to the outside of the backlight unit 20.

The light collecting member 23 collects the light emitted from the light source 21. The light collecting member 23 is, for example, a collecting lens. The light collecting member 23 includes a semispherical lens main body portion 23b having a semispherical lens surface 23a and a flange portion 23c formed along an outer periphery of the lens main body portion 23b.

The micromirror array 25 is an optical member. The micromirror array 25 is made of, for example, glass or a transparent resin. The micromirror array 25 has a concave reflecting surface 26A, and reflects light incident from the light collecting member 23 toward the liquid crystal panel 10 by the reflecting surface 26A. In the micromirror array 25, the reflecting surface 26A includes a plurality of micromirrors 27. The micromirror array 25 has a shape similar to a so-called fly-eye lens. Here, the fly-eye lens is a lens body in which a plurality of lenses are arranged in a lattice form. The plurality of micromirrors 27 are arranged on the reflecting surface 26A in a lattice form. As illustrated in FIG. 3, one or more groups of the plurality of micromirrors 27 are arranged, for example, in an X direction in the reflecting surface 26A and a Y direction orthogonal to the X direction. Each micromirror 27 includes a convex curved surface.

The diffusion plate 30 is formed in a sheet shape or a thin plate shape and arranged on an optical path between the micromirror array 25 and the liquid crystal panel 10. The diffusion plate 30 causes light 11 reflected by the micromirror array 25 to be diffused toward the liquid crystal panel 10.

Next, an operation of the backlight unit 20 will be described with reference to FIGS. 2 to 5 and FIGS. 6A to 6C. As illustrated in FIG. 2, the light emitted from the light source 21 enters the light collecting member 23 from the incident side. The light passing through the light collecting member 23 is emitted from the lens surface 23a of the light collecting member 23. The light 11 emitted from the lens surface 23a of the light collecting member 23 is focused on the micromirror array 25. The light 11 which is collected by the light collecting member 23 and incident on the micromirror array 25 may be parallel light, divergent light, or convergent light. For example, in a case in which the light 11 entering the micromirror array 25 from the light collecting member 23 is the divergent light, the light collecting member 23 can be made smaller than the micromirror array 25, and an optical path length can be reduced.

The light incident on the micromirror array 25 is polarized toward the liquid crystal panel 10 by the reflecting surface 26A. As illustrated in FIG. 2, the micromirror array 25 is arranged at a position at which an angle of deviation amount of the reflected light to the liquid crystal panel 10 with respect to the light (incident light) 11 incident from the light collecting member 23 is α. The angle of deviation amount α in the present embodiment is preferably equal to or less than 40° since luminance unevenness is likely to occur in a case in which the angle of deviation amount α is large. The reflecting surface 26A in the present embodiment preferably has a concave shape which is decided so that the light 11 incident on the micromirror array 25 is focused on the liquid crystal panel 10. A size of a range illuminated by the reflecting surface 26A is preferably larger than a size of an image of an eye box (not illustrated) generated by an optical system of the head-up display device 1. The eye box includes the eye point 201 and serves as an area in which the driver 200 can visually recognize the virtual image 110. As illustrated in FIG. 4, the plurality of micromirrors 27 constituting the reflecting surface 26A forms a light source image 12 near a surface opposite to the reflecting surface 26A by the incident light 11. The micromirror 27 preferably has a shape of a convex curved surface which is decided so that the light from each light source image 12 is radiated to the entire surface of the liquid crystal panel 10. Further, the micromirror 27 preferably has a curvature of a curved surface, a pitch, a mirror width, and a mirror height to be described later which are decided so that the light from each light source image 12 is radiated to the entire surface of the liquid crystal panel 10, and light not radiated to the liquid crystal panel 10 is reduced. For example, in a case in which the liquid crystal panel 10 has a rectangular shape, a shape of the micromirror 27 at the front view is a rectangle.

The micromirror 27 in the present embodiment has a rectangular shape at the front view. The micromirror 27 has a long side of a length x in the X direction and has a short side of a length y in the Y direction. In other words, the micromirror 27 has a mirror width of a length x in the X direction and has a mirror height of a length y in the Y direction. The micromirrors 27 in the present embodiment have a mirror width of the same length in the X direction and have a mirror height of the same length in the Y direction. In the micromirror 27, the mirror width x and the mirror height y may be the same length.

The micromirrors 27 in the present embodiment have the same pitch Px in the X direction and the same pitch Py in the Y direction. Here, a pitch P (Px, Py) is a distance between center points of two adjacent micromirrors 27. In a graph illustrated in FIG. 3 in which a vertical axis indicates a pitch, and a horizontal axis indicates the X direction, the pitches Px of the micromirrors 27 arranged in the X direction among the plurality of micromirrors 27 are constant. Further, in a graph illustrated in FIG. 3 in which a vertical axis indicates the Y direction, and a horizontal axis indicates the pitch, the pitches Py of the micromirrors 27 arranged in the Y direction among the plurality of micromirrors 27 are constant.

The micromirror 27 in the present embodiment is a convex partially spherical surface as illustrated in FIG. 5. The micromirrors 27 have the same curvature radius R in the X direction and the Y direction. Since the curvature is a reciprocal of the curvature radius R, the micromirrors 27 have the same curvature 1/R in the X direction and have the same curvature 1/R in the Y direction. For example, the micromirrors 27 with a curvature radius R1 illustrated in FIG. 6A have a curvature of 1/R1.

The micromirrors 27 in the present embodiment have the same diverging angle φ in the X direction and have the same diverging angle φ in the Y direction. As illustrated in FIG. 2, the diverging angle φ is an angle at which the light reflected by the micromirror 27 spreads with respect to the optical axis. As illustrated in FIGS. 6A and 6B, in a case in which the micromirrors 27 have the same pitch P1, the diverging angle φ of the micromirror 27 has a relation of φ1>φ2 when the curvature radius R has a relation of R1<R2. In other words, as illustrated in FIGS. 6A and 6C, in a case in which the micromirrors 27 have the same curvature radius R1, the diverging angle φ has a relation of φ1<φ3 when the pitch P has a relation of P1<P2. As described above, the diverging angle φ of the micromirror 27 increases as the pitch P increases and decreases as the pitch P decreases. As the diverging angle φ increases, the luminance unevenness of the backlight unit 20 is more likely to occur, and thus it is preferable that the diverging angle φ be equal to or less than 50° at a full angle.

As described above, the backlight unit 20 according to the present embodiment includes the light source 21, the light collecting member 23 that collects light emitted from the light source 21, and the concave reflecting surface 26A, and includes the micromirror array 25 that reflects the light 11 incident from the light collecting member 23 toward the liquid crystal panel 10 by the reflecting surface 26A and the diffusion plate 30 that is arranged on the optical path between the micromirror array 25 and the liquid crystal panel 10. In the micromirror array 25, the reflecting surface 26A includes the plurality of micromirrors 27. One or more groups of the plurality of micromirrors 27 are arranged in the reflecting surface 26A in the X direction and the Y direction. Each micromirror 27 includes a convex curved surface.

Further, the head-up display device 1 according to the present embodiment includes at least the light transmissive liquid crystal panel 10 and the backlight unit 20. The backlight unit 20 includes the light source 21, the light collecting member 23 that collects the light 11 emitted from the light source 21, and the concave reflecting surface 26A, and includes the micromirror array 25 that reflects the light 11 incident from the light collecting member 23 toward the liquid crystal panel 10 by the reflecting surface 26A and the diffusion plate 30 that is arranged on the optical path between the micromirror array 25 and the liquid crystal panel 10. In the micromirror array 25, the reflecting surface 26A includes the plurality of micromirrors 27. One or more groups of the plurality of micromirrors 27 are arranged in the reflecting surface 26A in the X direction and the Y direction. Each micromirror 27 includes a convex curved surface.

According to the backlight unit 20 and the head-up display device 1 having the above-described configuration, since the entire surface of the liquid crystal panel 10 can be illuminated with a small part configuration using the micromirror array 25, it is possible to reduce the number of parts and reduce the cost. Further, the collecting lens or the like needs not to be arranged after the lens array, and it is possible to reduce the number of parts. Further, since the parallel light generating unit that converts the light from the light source into parallel light is unnecessary, it is possible to reduce the number of parts, and it is possible to reduce the size of the whole unit. Further, since the plurality of light source images 12 are formed using the micromirror array 25, and the entire surface of the liquid crystal panel 10 is illuminated by the respective light source images 12, the light utilization efficiency increases, and the luminance unevenness of the backlight unit 20 can be reduced. Further, conventionally, in order to illuminate the entire surface of the liquid crystal panel 10, the large-sized lens array and a plurality of light sources are necessary, but since the plurality of light source images 12 can be formed by the micromirror array 25, it is possible to reduce the number of light sources and reduce the size of the optical system. Further, in a case in which a plurality of light sources are used, the luminance unevenness occurs at a portion in which light overlaps, but since it is possible to perform illumination with a single light source 21, it is possible to reduce the power consumption and reduce the luminance unevenness.

In the micromirror array 25 according to the present embodiment, the micromirror 27 includes a convex curved surface, but the present embodiment is not limited thereto. For example, as illustrated in FIG. 7, in the micromirror array 25, a micromirror 37 may have a concave curved surface. One or more groups of a plurality of micromirrors 37 are arranged in a reflecting surface 26B in the X direction and the Y direction.

Further, in the backlight unit 20 according to the present embodiment, the diffusion plate 30 is arranged on the optical path between the micromirror array 25 and the liquid crystal panel 10, but the present invention is not limited thereto. For example, the backlight unit 20 may include an aberration correcting lens 31 in addition to the above configuration. The aberration correcting lens 31 is arranged on the optical path between the micromirror array 25 and the diffusion plate 30 as illustrated in FIG. 8. The aberration correcting lens 31 corrects the aberration of the optical system in the backlight unit 20. The aberration correcting lens 31 may be a lens, a mirror, or the like for performing defocus correction.

The backlight unit 20 according to the present embodiment may further include a reflective mirror 32 that is arranged on the optical path between the micromirror array 25 and the diffusion plate 30 and polarizes the light reflected from the micromirror array 25 toward the liquid crystal panel 10. The reflective mirror 32 is, for example, a plane mirror. With the above configuration, it is possible to further shorten the optical path from the light source 21 to the liquid crystal panel 10, and it is possible to reduce the size of the unit.

Second Embodiment

Figure 11:
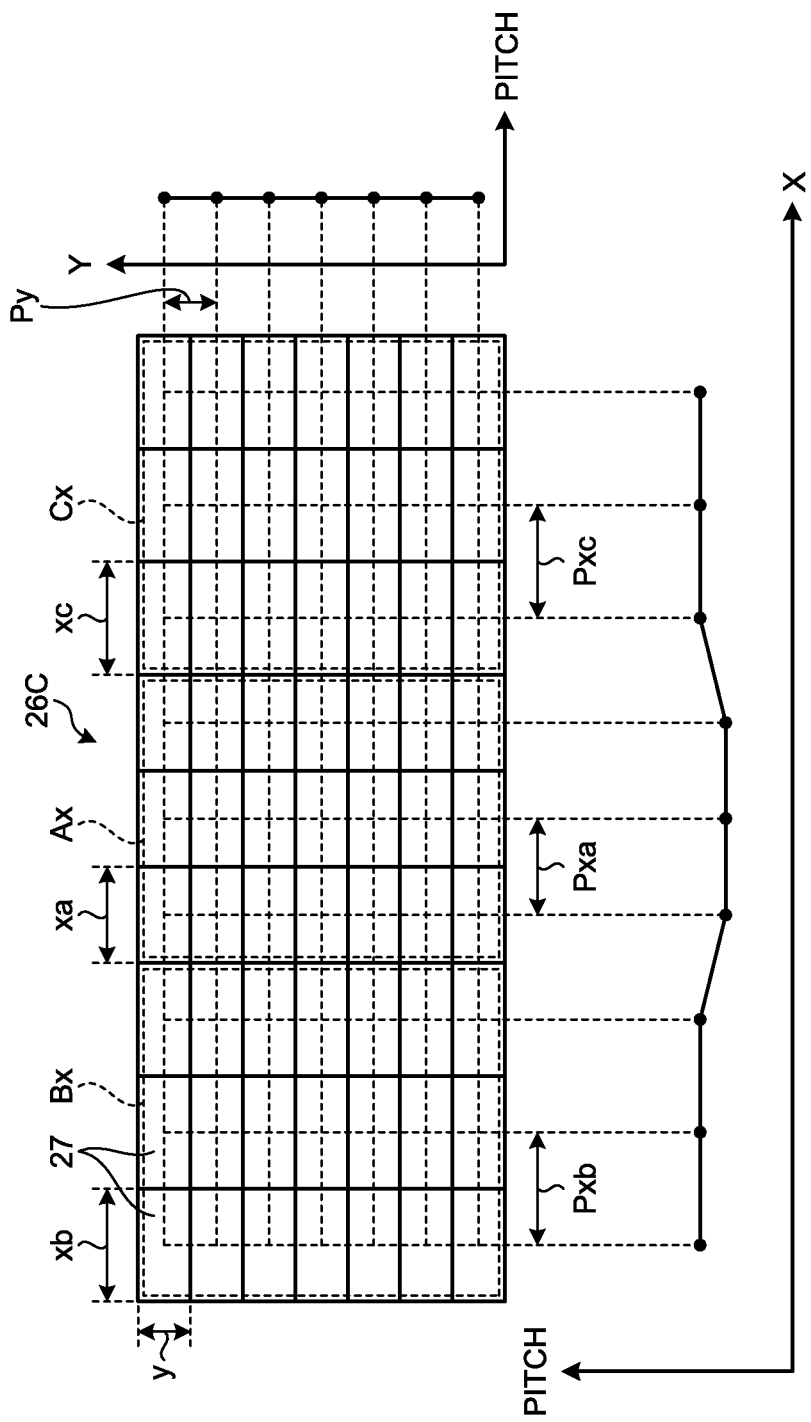
FIG. 11 is a front view of a micromirror array according to a second embodiment.
Figure 12:
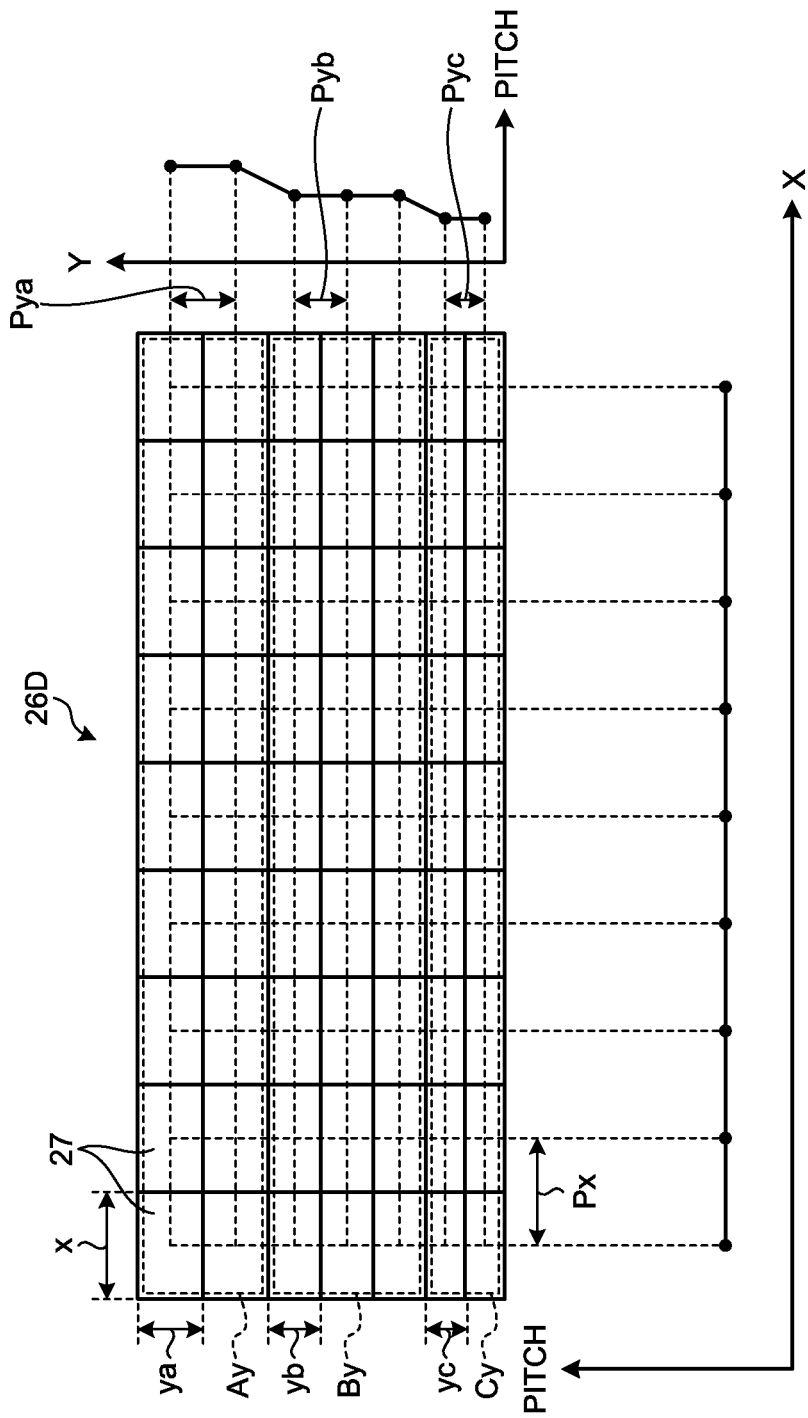
FIG. 12 is a front view of the micromirror array according to the second embodiment.
Figure 13:
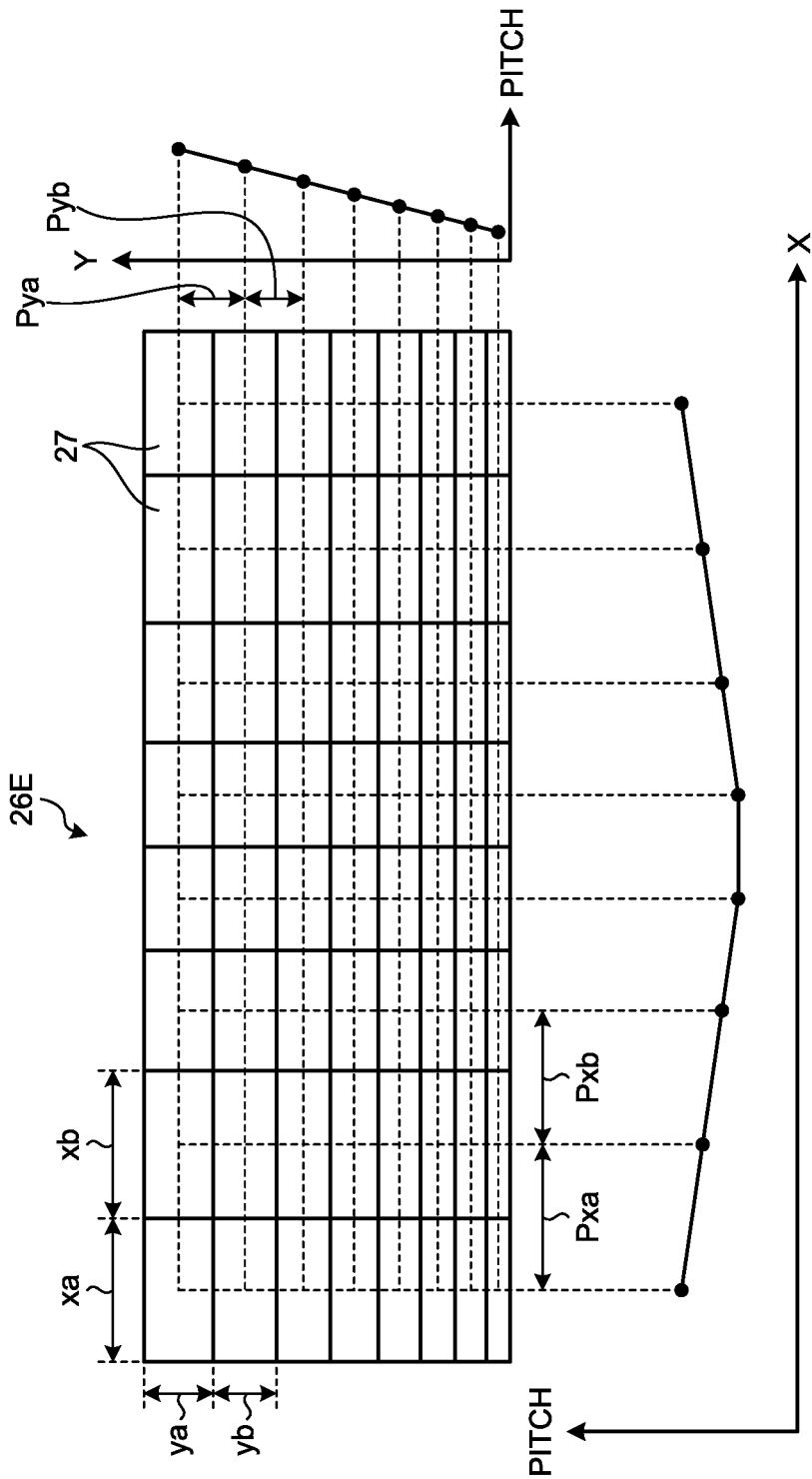
FIG. 13 is a front view of a micromirror array according to a modified example of the second embodiment.

Next, a backlight unit and a head-up display device according to a second embodiment will be described. FIG. 11 is a front view of a micromirror array according to a second embodiment. FIG. 12 is a front view of the micromirror array according to the second embodiment. FIG. 13 is a front view of a micromirror array according to a modified example of the second embodiment.

The backlight unit 20 and the head-up display device 1 according to the second embodiment differ from those of the first embodiment in that the micromirrors 27 have the same curvature 1/R and differ in the length in the direction in which they have the same curvature 1/R. In the following embodiment, components similar to those in the first embodiment are denoted by the same reference numerals, and redundant descriptions of common structures, operations, and effects are omitted as much as possible.

In the micromirror array 25 in the present embodiment, a reflecting surface 26C is configured with the plurality of micromirrors 27. The respective micromirrors 27 are formed such that the convex curved surfaces have the same curvature 1/R in at least one of the X direction and the Y direction and differ in the length in the direction in which they have the same curvature 1/R. For example, as illustrated in FIG. 11, the micromirrors 27 are formed such that lengths (mirror widths) xa, xb, and xc in the X direction in which they have the same curvature 1/R are different. In other words, the micromirrors 27 are formed such that the pitches Px in the X direction in which they have the same curvature 1/R are different. On the other hand, the micromirrors 27 are formed such that lengths (mirror heights) y in the Y direction in which they have the same curvature 1/R are equal. In other words, the micromirrors 27 are formed such that the pitches Py in the Y direction in which they have the same curvature 1/R are equal. On the other hand, the micromirrors 27 are formed such that lengths (mirror heights) ya, yb, and yc in the Y direction in which they have the same curvature 1/R are different, for example, as illustrated in FIG. 12. In other words, the micromirrors 27 are formed such that the pitches Py in the Y direction in which they have the same curvature 1/R are different. On the other hand, the micromirrors 27 are formed such that lengths (mirror widths) x in the X direction in which they have the same curvature 1/R are equal. In other words, the micromirrors 27 are formed such that the pitches Px in the X direction in which they have the same curvature 1/R are equal.

As described above, in the backlight unit 20 and the head-up display device 1 according to the present embodiment, the curved surfaces of the micromirrors 27 are formed to have the same curvature 1/R in at least one of the X direction and the Y direction and differ in the length in the direction in which they have the same curvature 1/R. Accordingly, it is possible to obtain effects similar to those of the backlight unit 20 and the head-up display device 1 in the first embodiment. The micromirror 27 is designed to illuminate the entire surface of the liquid crystal panel 10. However, since the distance between the micromirror 27 and the liquid crystal panel 10 differs, for example, between one end and the other end of the reflecting surface 26C, if the micromirrors 27 employ similar light spreading methods, the darkness increases as the distance increases, and the brightness increases as the distance decreases, leading to the luminance unevenness in the backlight unit 20. In this regard, in a case in which the curvatures 1/R of the curved surfaces of the micromirrors 27 are set to be constant, the length or pitch P in the direction in which they have the same curvature 1/R is increased for the micromirrors 27 at the short distance position, whereas the length or pitch P in the direction in which they have the same curvature 1/R is decreased for the micromirrors 27 at the long distance position. Since the illumination range is increased by increasing the diverging angle φ of the micromirror 27 having the large length or pitch P, and the illumination range is decreased by decreasing the diverging angle φ of the micromirror 27 having the small pitch P, it is possible to illuminate the entire surface of the liquid crystal panel 10 in a balanced manner and to reduce the luminance unevenness.

The micromirrors 27 according to the present embodiment may be formed such that the length or pitch P in the direction in which they have the same curvature 1/R differs for each of areas obtained by dividing the reflecting surface 26C in the direction in which they have the same curvature 1/R. For example, as illustrated in FIG. 11, the micromirrors 27 are formed such that the length or pitch P in the X direction in which they have the same curvature 1/R differs for each of areas Ax, Bx, and Cx obtained by dividing the reflecting surface 26C in the X direction. In other words, the micromirrors 27 in the area Ax have the same length xa or the same pitch Pxa. The micromirrors 27 in the area Bx have the same length xb or the same pitch Pxb. The micromirrors 27 in the area Cx have the same length xc or the same pitch Pxc. For example, the lengths xa, xb, and xc in the present embodiment have a relation of xa<xb=xc. For example, Pxa, Pxb, and Pxc in the present embodiment have a relation of Pxa<Pxb=Pxc. On the other hand, for example, as illustrated in FIG. 12, the micromirrors 27 are formed such that the length or pitch P in the Y direction in which they have the same curvature 1/R differs for each of areas Ay, By, and Cy obtained by dividing a reflecting surface 26D in the Y direction. The micromirrors 27 in the area Ay have the same length ya or the same pitch Pya. The micromirrors 27 in the area By have the same length yb or the same pitch Pyb. The micromirrors 27 in the area Cy have the same length yc or the same pitch Pyc. For example, ya, yb, and yc in the present embodiment have a relation of ya>yb>yc. Pya, Pyb, and Pyc in the present embodiment have a relation of Pya>Pyb>Pyc.

In the backlight unit 20 and the head-up display device 1 according to the modified example of the present embodiment having the above configuration, the respective micromirrors 27 are formed such that the length in the direction in which they have the same curvature 1/R differs for each of areas obtained by dividing the reflecting surfaces 26C and 26D in the direction in which they have the same curvature 1/R. Accordingly, it is possible to obtain effects similar to those described above, and it is unnecessary to individually design the length or pitch of the micromirrors 27, and thus it is possible to reduce the design man-hours.

Further, the respective micromirrors 27 according to the present embodiment may be formed such that the lengths in the direction in which they have the same curvature 1/R are consecutively different. For example, as illustrated in FIG. 13, the micromirrors 27 are formed such that the lengths xa, xb, and the like in the X direction in which they have the same curvature 1/R and lengths ya, yb, and the like in the Y direction in which they have the same curvature 1/R are different in a reflecting surface 26E. In other words, the micromirrors 27 are formed such that the pitches Pxa, Pxb, and the like in the X direction in which they have the same curvature 1/R and the pitches Pya, Pyb, and the like in the Y direction in which they have the same curvature 1/R are different. In a case in which the micromirrors 27 are formed such that the mirror widths x, the mirror heights y, and the pitches P are different consecutively, the mirror widths x, the mirror heights y, and the pitches P may be set to be different linearly or may be set to be different in non-linearly.

In the backlight unit 20 and the head-up display device 1 according to the modified example of the present embodiment having the above configuration, since the micromirrors 27 are formed such that the lengths in the direction in which they have the same curvature 1/R are consecutively different, it is possible to obtain effects similar to those described above.

Third Embodiment

Figure 14:
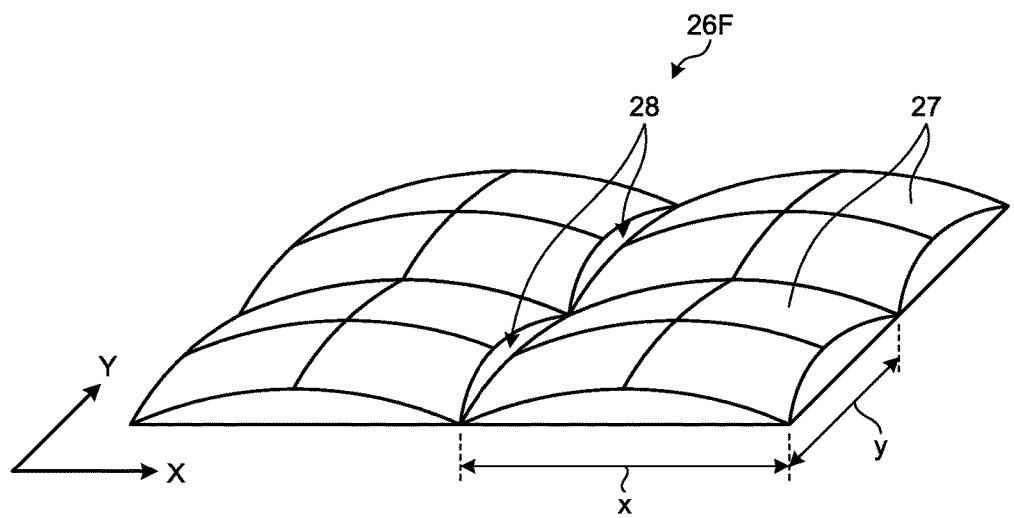
FIG. 14 is a perspective view of a micromirror according to a third embodiment.
Figure 15:
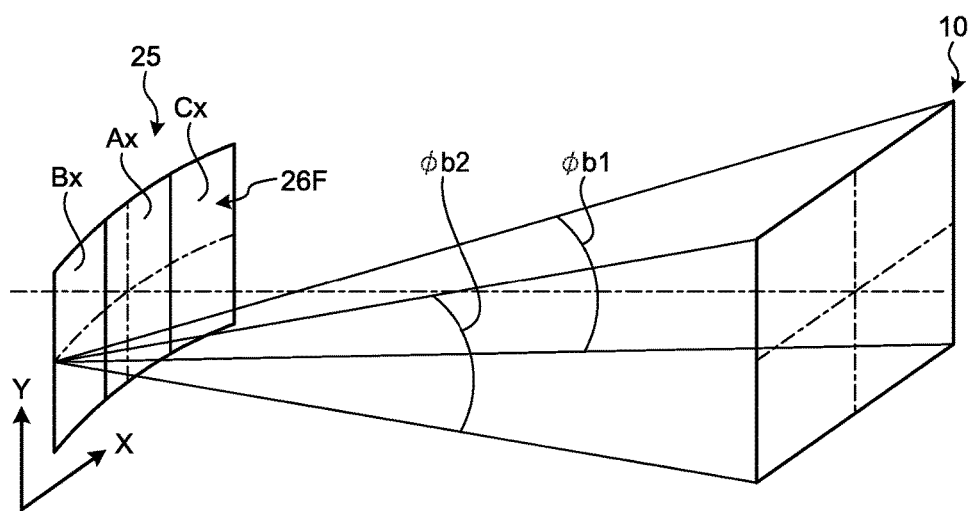
FIG. 15 is a schematic diagram for describing a difference in a diverging angle of a micromirror array according to the third embodiment.

Next, a backlight unit and a head-up display device according to a third embodiment will be described. FIG. 14 is a perspective view of a micromirror according to a third embodiment. FIG. 15 is a schematic diagram for describing a difference in a diverging angle of a micromirror array according to the third embodiment.

The backlight unit 20 and the head-up display device 1 according to the third embodiment differ from those of the first embodiment in that the micromirrors 27 are equal in the length in at least one direction of the X direction and the Y direction and different in the curvature 1/R of the curved surface in the direction in which they have the same length.

In the micromirror array 25 in the present embodiment, a reflecting surface 26F is configured with the plurality of micromirrors 27. The respective micromirrors 27 are formed such that the micromirrors 27 are equal in the length in at least one direction of the X direction and the Y direction, and convex curved surfaces are different in the direction in which they have the same length. A step difference 28 is formed between the micromirrors 27.

As described above, in the backlight unit 20 and the head-up display device 1 according to the present embodiment, the respective micromirrors 27 are formed such that the lengths in at least one of the X direction and the Y direction are equal, and the curvatures 1/R of the curved surfaces are different in the direction in which they have the same length. Accordingly, it is possible to obtain effects similar to those of the backlight unit 20 and the head-up display device 1 in the first embodiment. In a case in which the lengths or pitches P of the micromirrors 27 in at least one of the X direction and the Y direction are set to be equal, the curvature 1/R is decreased for the micromirror 27 at the short distance position, whereas the curvature 1/R is increased for the micromirror 27 at the long distance position. Since the illumination range is increased by increasing the diverging angle φ of the micromirror 27 having the large curvature 1/R (that is, the small curvature radius R), and the illumination range is decreased by decreasing the diverging angle φ of the micromirror 27 having the small curvature 1/R (that is, the large curvature radius R), it is possible to illuminate the entire surface of the liquid crystal panel 10 in a balanced manner, and it is possible to reduce the luminance unevenness.

Further, the micromirrors 27 according to the present embodiment may be formed such that the curvature 1/R of the curved surface in the direction in which they have the same length differs for each of areas obtained by dividing the reflecting surface 26F in the direction in which they have the same length. For example, as illustrated in FIG. 15, the micromirrors 27 are formed such that the curvature 1/R in the X direction in which they have the same length or pitch P differs for each of the areas Ax, Bx, and Cx obtained by dividing the reflecting surface 26F in the X direction. The micromirrors 27 have the same curvature 1/Ra in the area Ax. The micromirrors 27 have the same curvature 1/Rb in the area Bx. The micromirrors 27 have the same curvature 1/Rc in the area Cx. For example, as illustrated in FIG. 15, the micromirrors 27 in the area Bx (or the area Cx) have a small diverging angle ϕb1 since the distance to one end of the liquid crystal panel 10 is long but have a large diverging angle ϕb2 since the distance to the other end of the liquid crystal panel 10 is short. On the other hand, the micromirrors 27 in the area Ax have a relation of ϕb1=ϕb2. In this regard, for example, it is preferable that curvatures 1/Ra of the micromirrors 27 in the area Ax be set to be constant, and curvatures 1/Rb and 1/Rc of the micromirrors 27 in the areas Bx and Cx be smaller than the curvature 1/Ra. Further, the micromirrors 27 in the areas Bx and Cx may be formed such that the curvatures 1/Rb and 1/Rc are consecutively decreased toward an end portion opposite to the area Ax in the X direction. The micromirrors 27 may be formed such that the curvature 1/R in the Y direction in which they have the same length or pitch P differs for each of areas obtained by dividing the reflecting surface 26F in the Y direction or for each of areas obtained by dividing the reflecting surface 26F in the X direction and the Y direction. With the above configuration, it is possible to obtain effects similar to those described above, increase a quantity of light directed to the liquid crystal panel 10, and increase the light utilization efficiency. Further, it is not necessary to individually design the curvature 1/R of the micromirror 27, and it is possible to reduce the design man-hours.

Further, in the micromirrors 27 according to the present embodiment, the lengths in at least one of the X direction and the Y direction may be equal, and the curved surface may be a free curved surface having a plurality of curvatures 1/R. The plurality of curvatures 1/R may be set to be different in accordance with an angle of deviation amount α of the reflected light to the liquid crystal panel 10 with respect to the incident light from the light collecting member 23 in the direction in which the micromirrors 27 have the same length. For example, in a case in which the angle of deviation amount α is large, the curvature 1/R of the micromirror 27 is increased, whereas in a case in which the angle of deviation amount α is small, the curvature 1/R is decreased. With the above configuration, it is possible to obtain effects similar to those described above.

In the first to third embodiments and the modified examples, the micromirrors 27 have a rectangular shape, but the micromirrors 27 are not limited thereto, and the micromirrors 27 may have a square shape, a circular shape, or a hexagonal shape. The shape of the micromirror 27 is preferably decided in accordance with the shape of the liquid crystal panel 10 as described above.

In the first to third embodiments and modified examples, in the head-up display device 1, a target onto which the display image is projected is the windshield 101, but the present invention is not limited thereto, and may be, for example, a combiner or the like.

In the first to third embodiments and the modified examples, the example in which the head-up display device 1 is applied to the vehicle has been described, but the present invention is not limited thereto, and may be applied to transportation other than a vehicle, for example, a vessel or an aircraft.

In the first to third embodiments and the modified examples, the light source 21 is configured with one light emitting diode, but the present invention is not limited thereto, and the light source 21 may be, for example, one in which a plurality of light emitting diodes are integrated. Further, the light source 21 is not limited to a light emitting diode as long as high luminance light is emitted.

According to the backlight unit and the head-up display device of the present embodiment, it is possible to achieve a decrease in the number of parts and size reduction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A backlight unit, comprising:
   at least one light source;
   a light collecting member that collects light emitted from the light source;
   an optical member that includes a concave reflecting surface and reflects light incident from the light collecting member toward a light transmissive liquid crystal display element by the reflecting surface; and
   a diffusion plate that is arranged on an optical path between the optical member and the liquid crystal display element, wherein
   the reflecting surface of the optical member includes a plurality of micromirrors,
   one or more groups of the plurality of micromirrors are arranged in the reflecting surface in a first direction and a second direction orthogonal to the first direction, and
   each of the micromirrors includes a convex or concave curved surface.

2. The backlight unit according to claim 1, wherein
   the respective micromirrors are formed such that the curved surfaces have the same curvatures in at least one of the first direction and the second direction, and differ in a length in a direction in which the curved surfaces have the same curvature.

3. The backlight unit according to claim 2, wherein
   the respective micromirrors are formed such that a length in the direction in which the curved surfaces have the same curvature differs for each of areas obtained by dividing the reflecting surface in the direction in which the curved surfaces have the same curvature.

4. The backlight unit according to claim 2, wherein
   the respective micromirrors are formed such that lengths in the direction in which the curved surfaces have the same curvature are consecutively different.

5. The backlight unit according to claim 1, wherein
   the respective micromirrors are formed such that lengths in at least one of the first direction and the second direction are equal, and
   curvatures of the curved surfaces are different in a direction in which the micromirrors have the same length.

6. The backlight unit according to claim 5, wherein
   the respective micromirrors are formed such that the curvature of the curved surface in the direction in which the micromirrors have the same length differs for each of areas obtained by dividing the reflecting surface in the direction in which the micromirrors have the same length.

7. The backlight unit according to claim 1, wherein
   the respective micromirrors are formed such that lengths in at least one of the first direction and the second direction are equal, the curved surface is a free curved surface including a plurality of curvatures, and the plurality of curvatures are set to be different in accordance with an angle of deviation amount of reflected light to the liquid crystal display element with respect to incident light from the light collecting member in a direction in which the micromirrors have the same length.

8. A head-up display device, comprising:

a light transmissive liquid crystal display element; and a backlight unit, wherein the backlight unit includes:
- at least one light source;
- a light collecting member that collects light emitted from the light source;
- an optical member that includes a concave reflecting surface and reflects light incident from the light collecting member toward the liquid crystal display element by the reflecting surface; and
- a diffusion plate that is arranged on an optical path between the optical member and the liquid crystal display element, the reflecting surface of the optical member includes a plurality of micromirrors, one or more groups of the plurality of micromirrors are arranged in the reflecting surface in a first direction and a second direction orthogonal to the first direction, and each of the micromirrors includes a convex or concave curved surface.

* * * * *